United States Patent
Taoka

(10) Patent No.: US 8,824,818 B2
(45) Date of Patent: Sep. 2, 2014

(54) IMAGING APPARATUS AND IMAGE PROCESSING METHOD

(71) Applicant: Samsung Electronics Co., Ltd., Gyeonggi-do (KR)

(72) Inventor: Mineki Taoka, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 99 days.

(21) Appl. No.: 13/717,187

(22) Filed: Dec. 17, 2012

(65) Prior Publication Data

US 2013/0182966 A1 Jul. 18, 2013

(30) Foreign Application Priority Data

Dec. 15, 2011 (JP) ................................. 2011-275001

(51) Int. Cl.
*G06K 9/36* (2006.01)
*G06T 9/00* (2006.01)
*G06K 9/46* (2006.01)

(52) U.S. Cl.
CPC ...................................... *G06T 9/004* (2013.01)
USPC ......................................................... 382/238

(58) Field of Classification Search
USPC .......................... 382/173, 232, 233, 238, 240; 375/240.13, 240.16, E07.243
See application file for complete search history.

(56) References Cited

U.S. PATENT DOCUMENTS

| | | | |
|---|---|---|---|
| 8,625,916 B2 * | 1/2014 | Sohn et al. | 382/238 |
| 8,654,845 B2 * | 2/2014 | Tao et al. | 375/240.13 |
| 2013/0034166 A1 * | 2/2013 | Shiodera et al. | 375/240.16 |
| 2013/0114723 A1 * | 5/2013 | Bici et al. | 375/240.16 |
| 2013/0182966 A1 * | 7/2013 | Taoka | 382/238 |
| 2013/0294512 A1 * | 11/2013 | Song et al. | 375/240.13 |

FOREIGN PATENT DOCUMENTS

JP  2002354364  12/2002

\* cited by examiner

*Primary Examiner* — Amir Alavi
(74) *Attorney, Agent, or Firm* — The Farrell Law Firm, P.C.

(57) ABSTRACT

Disclosed is an imaging apparatus capable of, when a JPEG compression encoding is performed by dividing an image after an image processing into a plurality of blocks, simply performing the JPEG compression encoding and a combination of images after the encoding without encoding efficiency deterioration or a limitation in an image size of the block. The imaging apparatus includes an image processor for horizontally dividing image data into a plurality of blocks and supplying the blocks to an encoder without passing through a storage unit, the encoder for simultaneously storing an initiation address of a corresponding line to be encoded in a corresponding block and a data length after the corresponding line is encoded in the storage unit, and storing information used for a predictive encoding in the storage unit in every corresponding line to be encoded in the corresponding block.

14 Claims, 12 Drawing Sheets

IMAGING APPARATUS AND IMAGE PROCESSING METHOD

PRIORITY

This application claims priority under 35 U.S.C. §119(a) to Japanese Application Serial No. 2011-275001, which was filed in the Japanese Patent Office on Dec. 15, 2011, the entire content of which is hereby incorporated by reference.

BACKGROUND OF THE INVENTION

1. Field of the Invention

The present invention relates generally to digital image processing, and more particularly, to an imaging apparatus and an imaging processing method capable of quickly performing digital image processing.

2. Description of the Related Art

An image compression encoding in a JPEG mode processes one entire screen as one unit. On the other hand, one image can be divided into a plurality of blocks in a vertical direction and the divided blocks are processed in order to save capacities of a line memory, within a Large Scale Integration (LSI) circuit installed in a digital still camera and the like.

Accordingly, in order to process one entire image and then make the image be in a JPEG compressible state, it is required to stop a processing for all blocks and record a result of the processing in an external memory such as an SDRAM and the like to combine the blocks and the result of the processing. Further, a JPEG compression encoder for JPEG compression reads an image configured in an external memory to execute a compression encoding. To this end, the JPEG compression in a digital still camera is performed through a process of recording one image in an external memory, such as an SDRAM, at all times and also reading the image from the corresponding external memory.

In many cases, a speed capability of a conventional digital still camera is determined by a speed capability of an imaging apparatus. Further, the speed capability of the digital still camera requires only a continuous shooting capability in a degree of three frames to seven frames per second. However, the imaging apparatus currently has a high capability, and there is a trend towards using a resolution of 12 to 20 megapixels or more. Further, the speed capability currently requires a continuous shooting capability in a degree of 10 to 15 frames per second, and a processing capability required for the digital still camera becomes much higher in comparison with the conventional camera.

For this reason, when reading from and writing to the external memory of the image apparatus are repeatedly performed for the JPEG compression encoding of the image, power consumption increases and costs also increase due to an increase in the number of mounted external memories for resolving a low speed problem according to an increase in the reading and writing. Accordingly, it is typically required to execute the JPEG compression encoding of the image without performing the reading from and the writing to the external memory as much as possible.

In order to execute the JPEG compression encoding of the image without the use of the external memory as much as possible, there is a method of executing the JPEG compression encoding for each of a plurality of blocks vertically divided from one image and combining the blocks in performing a record in a recording medium. Accordingly, the number of accesses to the external memory is reduced. For example, Japanese Patent Application No. 2002-354364 discloses executing the JPEG compression encoding for each of the plurality of blocks vertically divided from one image. The JPEG compression encoding is performed by adding a Restart (RST) marker code to each of the divided blocks and an image combination after the compression. However, differential encoding is not used in a boundary of the divided blocks, so that encoding efficiency is low and there is a limitation in an image size of the divided block.

FIG. 1 illustrates the technology, disclosed in Japanese Patent Application No. 2002-354364, of adding a Restart Marker code (RST) to each of a plurality of blocks vertically divided from one image in order to reduce the number of accesses to an external memory in a Joint Photographic Expert Group (JPEG) compression encoding.

The JPEG compression encoding does not have to be performed for one entire image but can be performed after separating parts of the image by the RST maker codes. FIG. 1 illustrates compression encoding performed by dividing one image into four blocks (tile 0, tile 1, tile 2, and tile 3) and adding the RST marker code to a rightmost side of an MCU line of each block. When one image is divided into a plurality of blocks, the RST marker code is added to an end of the Minimum Coded Unit (MCU) line of each block and then encoding is performed.

However, when the encoding is performed as described above, a data storing direction becomes a direction in units of blocks, and does not correspond to "tile 0→tile 1→tile 2→tile 3. Accordingly, in order to store the image data after the encoding, rearrangement according to an order of an MCU line in an uppermost row of tile 0→an MCU line in an uppermost row of tile 1→ . . . is required.

Since a variable length encoding is used in JPEG encoding, a code amount for each pixel or MCU is not consistent, and the encoding is not performed in units of bytes. However, since the RST marker code is needed to be in a byte boundary, each MCU row becomes the byte unit, and thus handling in the external memory is simple.

However, this method of performing a compression by adding the RST marker code has the following problems.

First, when compression is performed by adding the RST marker code, encoding efficiency deteriorates. In JPEG, encoding is performed by taking a differential to perform a Direct Current (DC) prediction based on information on the block in a left side. When the image is divided into a plurality of blocks and the blocks are separated by the RST marker code, the differential is reset in units of blocks, so that a configuration is simple. However, the number of RST marker codes corresponding to the division is required to be added and encoding efficiency deteriorates since the differential encoding cannot be used between blocks.

FIG. 2 illustrates a case where differential encoding is not used between blocks in the prior art. As illustrated in FIG. 2, encoding can be performed between MCUs in the same block by performing a DC prediction. However, since differential encoding cannot be used between different blocks, encoding efficiency deteriorates in a part escaping from the corresponding block.

Subsequently, there is a limitation in an image size in the compression performed by adding the RST marker code. The image size between RST marker codes is required to be uniform. In general, since the compression is performed in units of 16 vertical pixels based on a luminance component in the JPEG image of the digital still camera, each block must be in units of 16 pixels. For example, when there is a configuration of vertically dividing an image into four blocks, an image size can be changed only in units of 64 pixels.

However, although a block size becomes smaller, such as 256 horizontal pixels or 512 horizontal pixels, an entire image becomes larger, such as 5000 to 8000 pixels. Accordingly, when an image is processed by dividing the image into, for example, 32 blocks, an image size is changed only in units of 256 pixels.

However, such a suitable imaging device is by no means common, and black data may be inserted into a right side of an indivisible part of the image. FIG. 3 illustrates an example of the above case. When the image size is 7952 pixels in a horizontal direction, and a width of each block is 256 pixels, only 16 pixels are actual image data in a rightmost block. If the black data is not inserted into the remaining pixels, the pixels cannot be processed as a block.

SUMMARY OF THE INVENTION

The present invention has been made to address at least the above problems and/or disadvantages and to provide at least the advantages described below. Accordingly, an aspect of the present invention provides an imaging apparatus and an image processing method which do not use an external memory in image processing.

The present invention also provides an imaging apparatus and an image processing method which simply performs, when JPEG compression encoding is performed by dividing an image after an image processing into a plurality of blocks, the JPEG compression encoding and a combination of images after the encoding without an encoding efficiency deterioration and a limitation in an image size of the block.

In accordance with an aspect of the present invention, an imaging apparatus is provided. The imaging apparatus includes an image processor for generating image data from data generated by a light input into an imaging device; an encoder for encoding the image data to generate encoded image data; and a storage unit for storing the encoded image data, wherein the image processor horizontally divides the image data into a plurality of blocks and supplies the blocks to the encoder without passing through the storage unit, and when the image data is encoded in a unit of blocks, the encoder simultaneously stores an initiation address of a corresponding line to be encoded in a corresponding block and a data length after the corresponding line is encoded in the storage unit and stores information used for a predictive encoding in the storage unit in every corresponding line to be encoded in the corresponding block.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
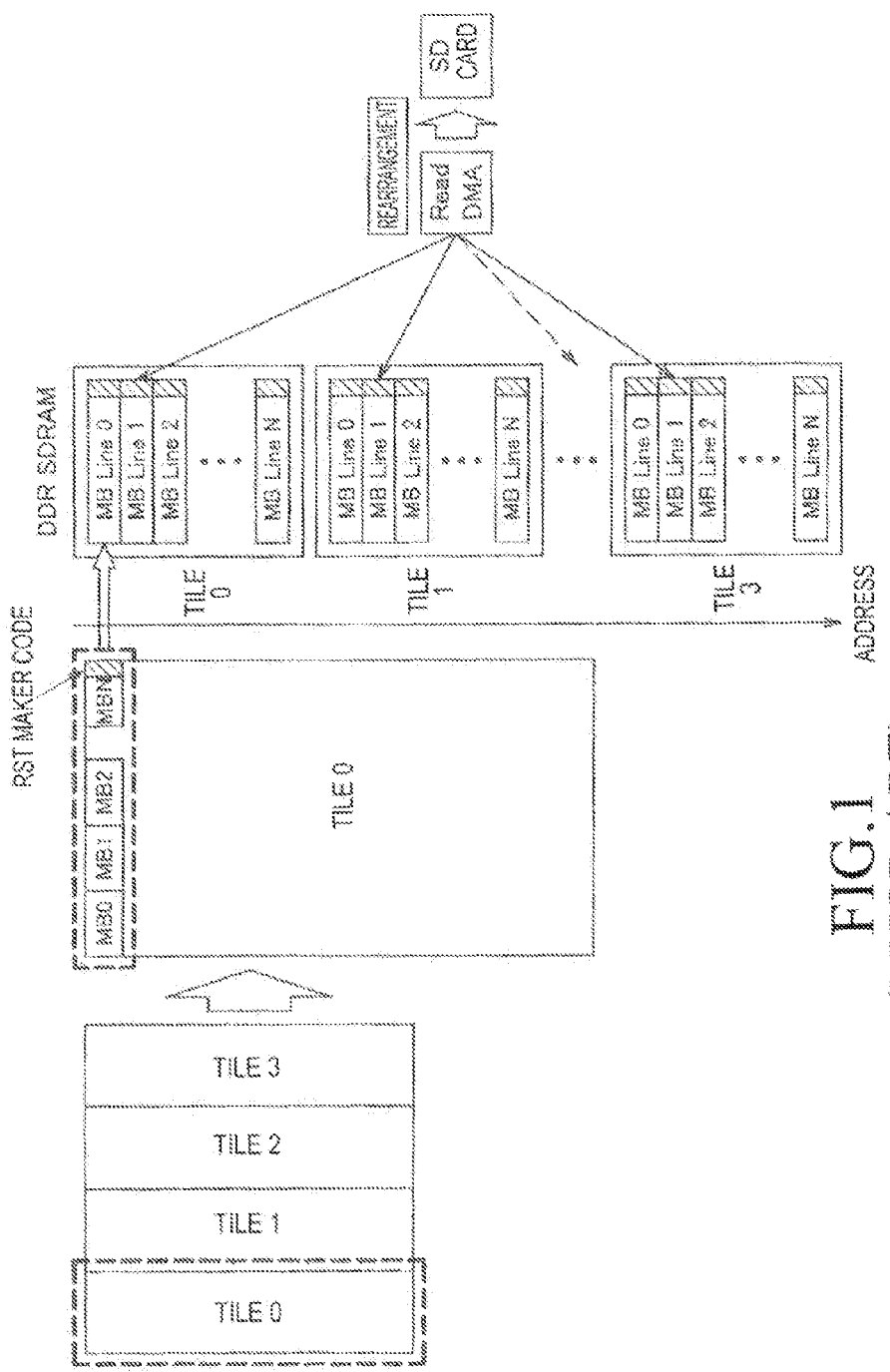
FIGS. 1 to 3 illustrate a conventional image processing process.
Figure 2:
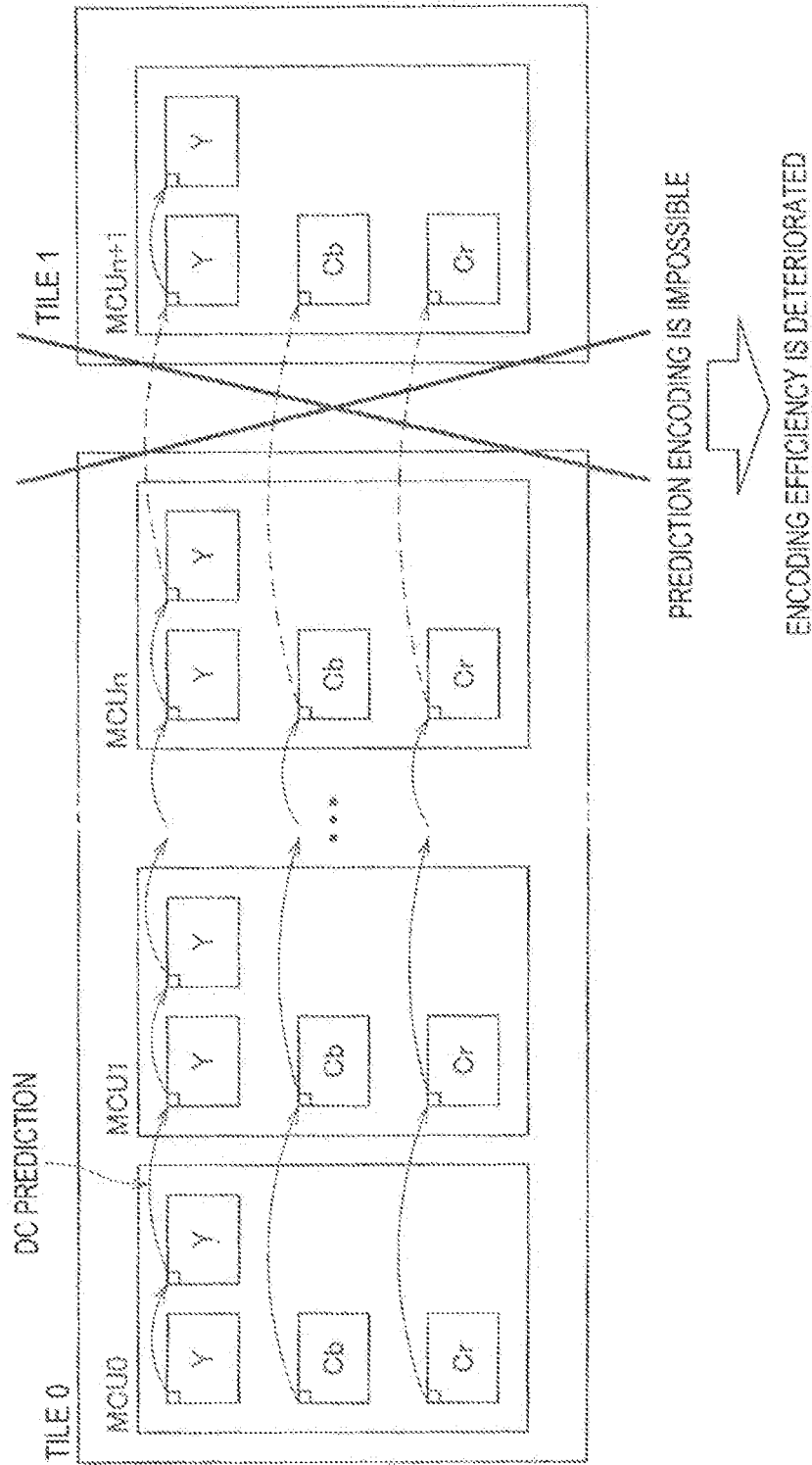
Figure 3:
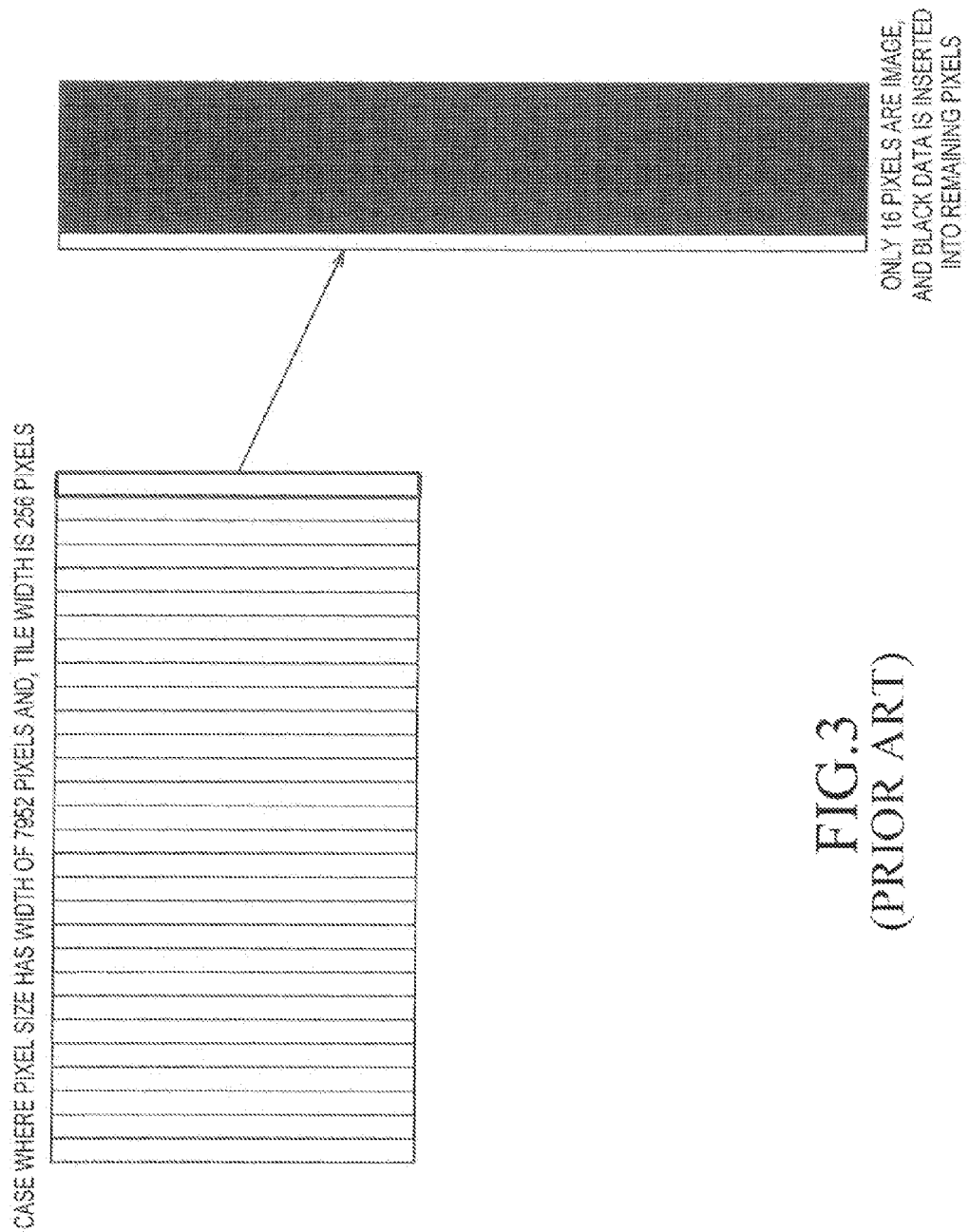

Hereinafter, various embodiments of the present invention will be described with reference to the accompanying drawings. In the following description, the same elements will be designated by the same reference numerals although they are shown in different drawings, and duplicated descriptions will be omitted.

According to the present invention described below, when the JPEG compression encoding is performed by dividing an image after an image processing into a plurality of blocks without passing through an external memory, there is no limitation in an image size of the block and it is possible to simply perform the JPEG compression encoding and a combination of images after the compression.

Figure 4:
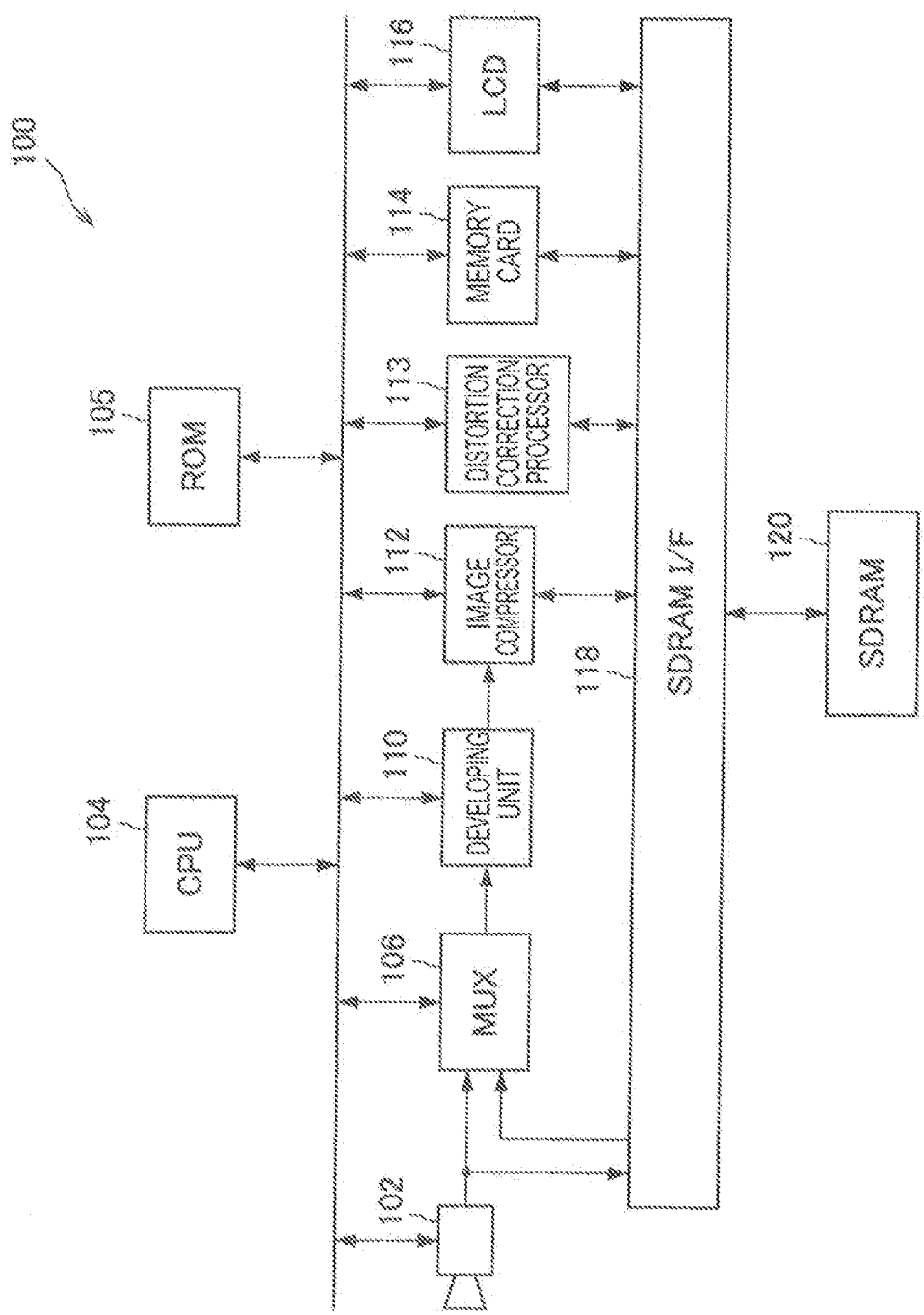
FIG. 4 is a block diagram illustrating a configuration of a digital still camera according to an embodiment of the present invention.

First, a configuration of a digital still camera according to an embodiment of the present invention will be described. FIG. 4 is a block diagram illustrating the configuration of the digital still camera according to an embodiment of the present invention.

The digital still camera 100 illustrated in FIG. 4 is an example of the imaging apparatus of the present invention. As illustrated in FIG. 4, the digital still camera 100 according to an embodiment of the present invention includes a camera unit 102, a CPU 104, a ROM 105, a multiplexer (MUX) 106, a developing unit 110, an image compressor 112, a distortion correction processor 113, a memory card 114, an LCD 116, a Synchronous Dynamic Random Access Memory Interface (SDRAM I/F) 118, and an SDRAM 120.

Although not illustrated in FIG. 4, the camera unit 102 may include a zoom lens, a focusing lens, an imaging device to which color filters in a Bayer array are installed, and the like. The camera unit 102 provides a light from a subject to the imaging device which converts the light to an electrical signal, and outputs RGB image data in the Bayer array from the imaging device. Here, as the imaging device, a Charge Coupled Device (CCD) image sensor or a Complementary Metal Oxide Semiconductor (CMOS) image sensor may be used. The camera unit 102 transmits the RGB image data in the Bayer array (the RGB image data in the Bayer array output from the camera unit 102 is referred to simply as "data") generated and output from the camera unit 102 to the SDRAM 120 through the SDRAM I/F 118 or directly transmits the generated RGB image data to the multiplexer 106.

The Central Processing Unit (CPU) 104 controls an operation of each component included in the digital still camera 100. Various programs or setting information used for controlling the operation of the digital still camera 100 are stored in the ROM 105. The multiplexer 106 receives the data generated and output from the camera unit 102 and the image data stored in the SDRAM 120 and outputs the data and the image data to the developing unit 110.

The developing unit 110 generates image data including YCbCr information containing a luminance signal and a chromaticity signal by using the data generated in the camera unit 102. In other words, the developing unit 110 executes a process corresponding to a developing process. The image data generated by the developing unit 110 is transferred to the image compressor 112.

The image compressor 112 performs a predetermined image compression processing on the image data generated by the developing unit 110. As the predetermined image compression processing, the image compressor 112 compresses the image data to JPEG. Under a control of the CPU 104, the image data compressed by the image compressor 112, that is, encoded image data is transferred to the SDRAM 120 through the SDRAM I/F 118.

The distortion correction processor 113 simultaneously restrains power consumption by controlling a supply of a clock provided to the SDRAM 120 and corrects a distortion of the encoded image data stored in the SDRAM 120. In this way, the distortion of the encoded image data stored in the SDRAM 120 may be corrected by the distortion correction processor 113.

The memory card 114 is a storage device for storing the encoded image data compressed by the image compressor 112 and stored in the SDRAM 120. The encoded image data may be stored in the memory card 114 under a control of the CPU 104.

The Liquid Crystal Display (LCD) 116 displays various setting screens of the digital still camera 100, displays the data generated by the camera unit 102 in real time (for example, in a live view type), or displays the image data stored in the memory card 114. Further, although the present embodiment uses an LCD, the present invention may use a display device other than the LCD, for example, a display device using an organic Electro-luminance (EL) display.

The SDRAM I/F 118 is an interface located between the SDRAM 120 and the above described components. The SDRAM I/F 118 mediates the data recording in the SDRAM 120 or the data reading from the SDRAM 120. The SDRAM 120 is a storage device for temporarily storing the data generated by the camera unit 102, the data developed by the developing unit 110, the image data compressed by the image compressor 112, and the like. Further, although not illustrated in FIG. 4, the digital still camera 100 may further include an input unit for receiving an input control of the user, and the input unit may include a shutter button for executing a photographing processing or a control button for controlling the digital still camera 100.

According to the present embodiment, when the image data is generated, the developing unit 110 directly supplies the image data to the image compressor 112 without passing through the SDRAM 120. Accordingly, a time required from the photographing by the camera unit 102 to the completion of the compression by the image compressor 112 is reduced and thus a processing speed is faster.

In the above description, the configuration of the digital still camera 100 according to an embodiment of the present invention has been discussed with reference to FIG. 4. Hereinafter, a configuration of the image compressor 112 included in the digital still camera 100 according to an embodiment of the present invention will be described.

Figure 5:
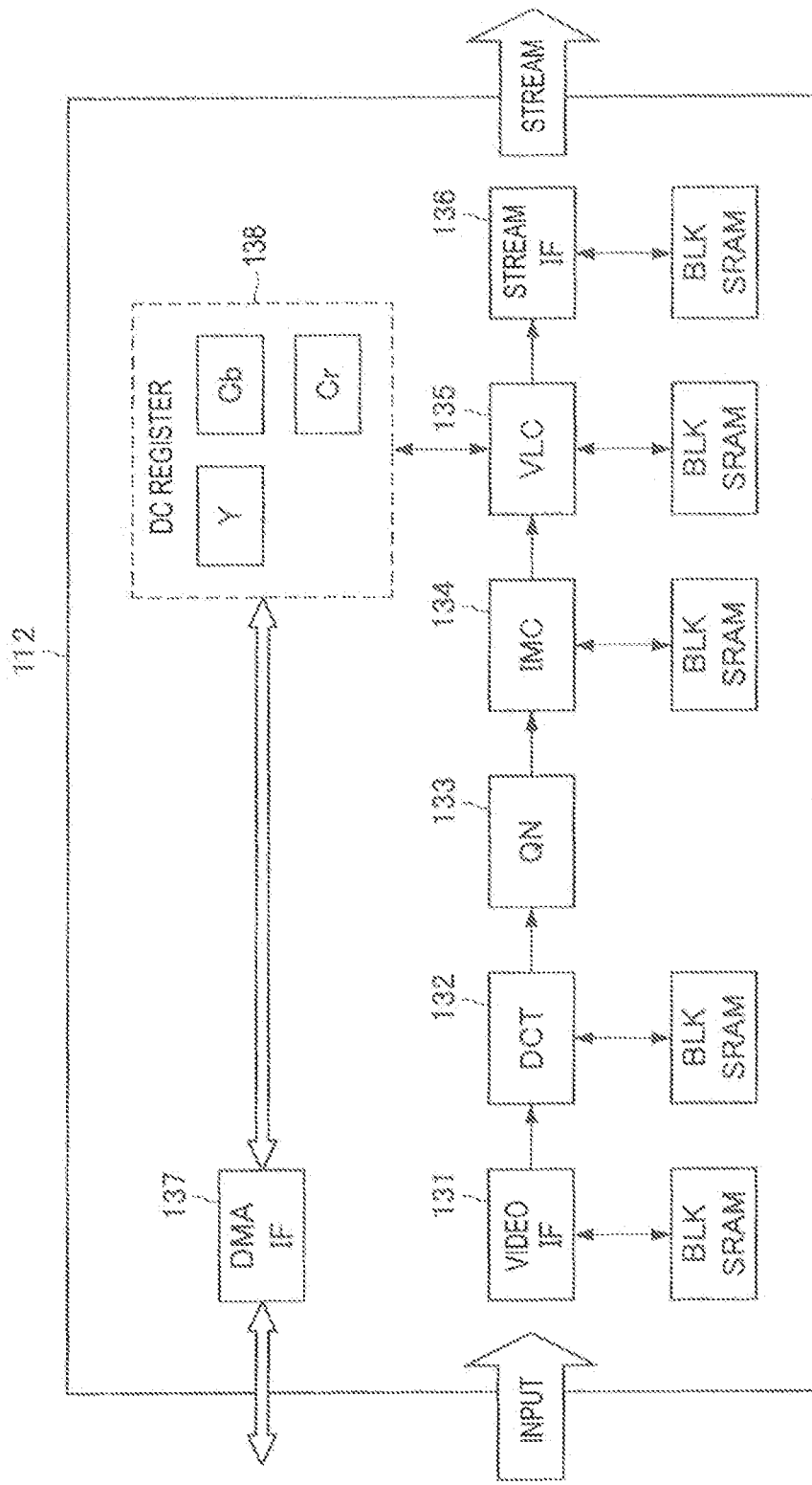
FIG. 5 is a block diagram illustrating a configuration of an image compressor according to an embodiment of the present invention.

FIG. 5 illustrates the configuration of the image compressor 112 included in the digital still camera 110 according to an embodiment of the present invention.

As illustrated in FIG. 5, the image compressor 112 included in the digital still camera 100 according to an embodiment of the present invention includes a video I/F 131, a Discrete Cosine Transform (DCT) unit 132, a quantizer 133, an Inverse Motion Compensation (IMC) unit 134, a variable length encoder 135, a stream I/F 136, and a Direct Memory Access Interface (DAM I/F) 137.

The video I/F 131 receives the image data from the developing unit 110. The video I/F 131 outputs the image data input from the developing unit 110 to the DCT unit 132. The DCT unit 132 performs a DCT on the image data input from the video I/F 131. The DCT unit 132 transmits the discrete cosine transformed data to the quantizer 133. The quantizer 133 quantizes the discrete cosine transformed data. The IMC unit 134 performs an inverse motion compensation on the quantized data.

The variable length encoder 135 performs variable length encoding on the inversely motion compensated image data. The variable length encoder 135 writes out a DC value of each of Y, Cb, and Cr in performing the variable length encoding on the image data. When the DC value of each of Y, Cb, and Cr is written, the variable length encoder 135 outputs information on the written DC value to the DMA I/F 137 and is stored in a DC register 138. Further, when the image data is variable length encoded, the variable length encoder 135 transmits the encoded data to the stream I/F 136.

The stream I/F 136 outputs the data variable length encoded by the variable length encoder 135 as a stream. The DMA I/F 137 stores the DC value of each of Y, Cb, and Cr written by the variable length encoder 135 in the SDRAM 120, and also reads the DC value of each of Y, Cb, and Cr stored in the SDRAM 120 as necessary and transmits the read DC value to the variable length encoder 135. In a series of processing by the image compressor 112, an access to an SRAM (not shown) may be performed as necessary.

The image compressor 112 included in the digital still camera 100 according to an embodiment of the present invention is configured as illustrated in FIG. 5. Even when one image is vertically divided, a predictive encoding is possible in a part escaping from the corresponding block (a part bridging over the corresponding block), so that the encoding can be completed without encoding efficiency deterioration.

Further, the configuration of the image compressor 112 is not limited to the above example. The image compressor 112 may be configured such that information on an initiation address of each MCU row, a bit length of each MCU row after the encoding, and the DC value of each of Y, Cb, and Cr are stored in the SDRAM 120 and accordingly, the configuration of the image compressor 112 is not limited to as illustrated in FIG. 5.

The configuration of the image compressor 112 included in the digital still camera 100 according to an embodiment of the present invention has been described. Subsequently, an operation of the digital still camera 100 according to an embodiment of the present invention will be described.

Figure 6:
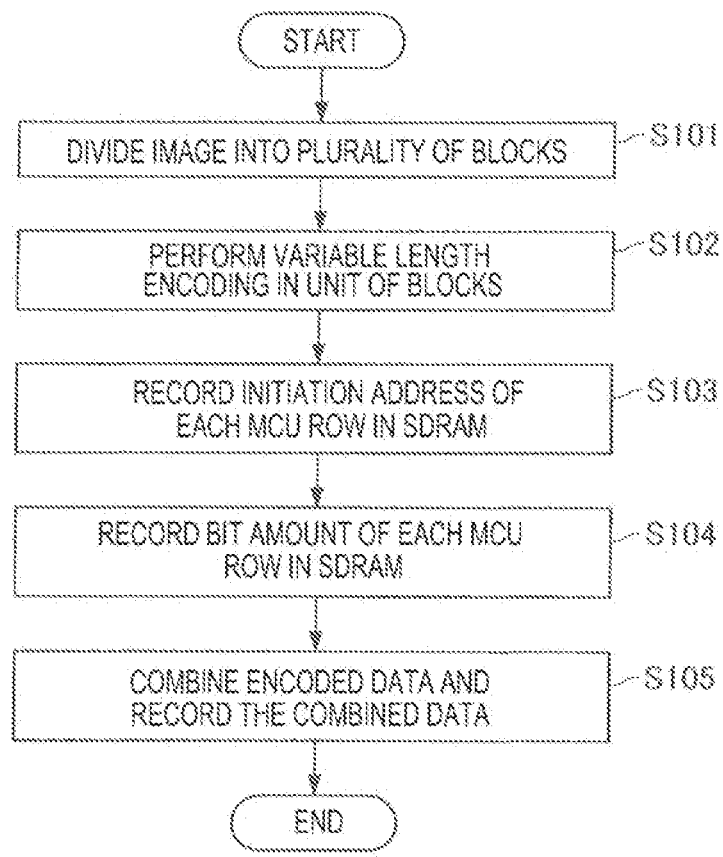
FIG. 6 is a flow chart illustrating an operation process of a digital still camera according to an embodiment of the present invention.

FIG. 6 is a flowchart illustrating the operation of the digital still camera 100 according to an embodiment of the present invention. The flowchart in FIG. 6 shows an operation process when the digital still camera 100 performs the JPEG compression encoding on the image according to an embodiment of the present invention.

When the image data including the YCbCr information containing the luminance signal and the chromaticity signal is generated, the developing unit 110 vertically divides the image data into a plurality of blocks in step S101. Here, one divided block is referred to as a "tile". The developing unit 110 sequentially supplies the divided image data directly to the image compressor 112 without passing through the SDRAM 120.

Figure 7:
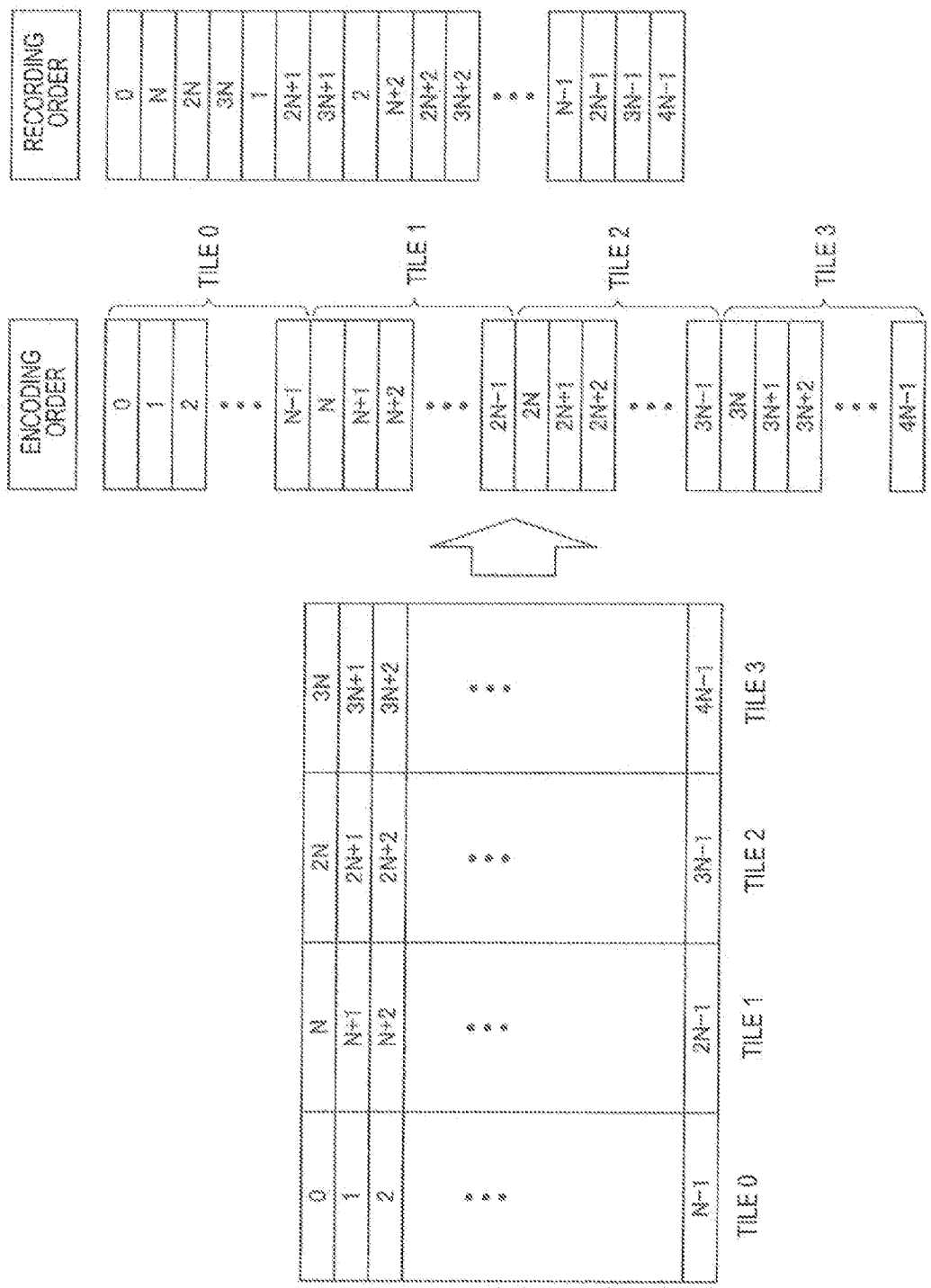
FIG. 7 illustrates a relation among division of image data, an encoding order of the divided image data, and a recording order of a memory card.

FIG. 7 illustrates a relation among division of the image data, an encoding order of the image data, and a recoding order of the memory card. FIG. 7 illustrates a case where one image data is divided into four tiles, such as tile 0, tile 1, tile 2, and tile 3. Further, in an example of FIG. 7, it is assumed that one tile consists of N MCU rows.

The image compressor 112 performs the variable length encoding on the image, which is generated by the developing unit 110 and divided into a plurality of blocks, in units of blocks in step S102. As illustrated in FIG. 7, for tile 0 corresponding to a leftmost tile, the image compressor 112 first performs the variable length encoding sequentially from a top. Further, when the variable length encoding on the image in a lowest MCU row has been completed, the image compressor 112 equally performs the variable length encoding in units of MCU rows sequentially from a top, for tile 1 corresponding to a next tile.

Here, when the variable length encoding is performed on tile 0 in units of MCU rows sequentially from a top, the image compressor 112 records the DC value of each of Y, Cb, and Cr of the MCU in a rightmost side of the MCU row in the SDRAM 120. As described below, as the DC value of each of Y, Cb, and Cr of the MCU in the rightmost side of the MCU row is recorded in the SDRAM 120, a predictive encoding on an MCU in a leftmost side of a corresponding MCU row of an adjacent tile is possible.

When the variable length encoding on the image divided into a plurality of blocks is performed in units of blocks, the image compressor 112 records information on an initiation address of each MCU row in the SDRAM 120 in step S103, and records information on a bit amount of each MCU row in the SDRAM 120 in step S104.

Since the image compressor 112 performs the variable length encoding on the MCU row, a length of each MCU row after the encoding is not consistent. Accordingly, when the data after the encoding is rearranged, combined, and recorded in the memory card 114 as illustrated in FIG. 7, it should be recognized where the data of each MCU row is. Therefore, the initiation address information of each MCU row after the encoding is recorded in the SDRAM 120, and the initiation address information is referred to when the data of each MCU row is recorded in the memory card 114.

Further, when the data of each MCU row is recorded in the memory card 114, it is necessary to know amounts of the data of each MCU row to be read and code amounts of each MCU in order to know the number of remaining bit amounts. Accordingly, the information on the bit amount of each MCU row after the encoding is recorded in the SDRAM 120.

Figure 8:
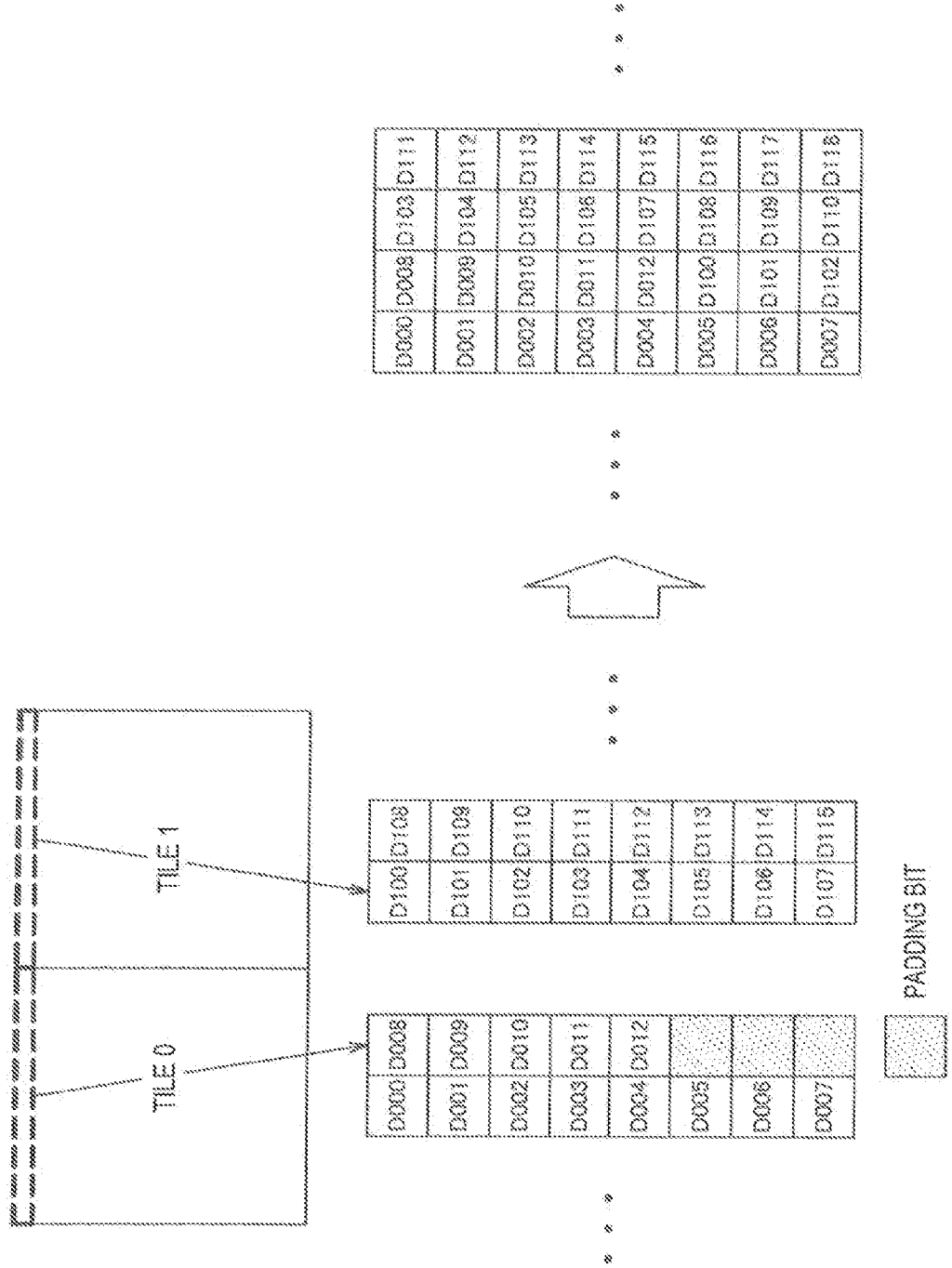
FIG. 8 illustrates a combination processing of variable length encoded data by an image compressor according to an embodiment of the present invention.

FIG. 8 illustrates a combination processing of data that has been variable length encoded by the image compressor 112. FIG. 8 shows an example of a case where an MCU row in an uppermost part of tile 0 and an MCU row of an uppermost part of tile 1 are combined. Further, FIG. 8 shows an example of a state where last three bits remain and the last three bits are filled with predetermined padding bits when the MCU row in the uppermost part of tile 0 is variable length encoded.

In this case, an initiation address of the MCU row in the uppermost part of tile 0, information on a bit amount of each MCU row after the encoding, and information on the remaining bit amounts are stored in the SDRAM 120. Similarly, an initiation address of the MCU row in the uppermost part of tile 1, information on a bit amount of each MCU row after the encoding, and information on the remaining bit amounts are stored in the SDRAM 120.

In step S105, when the JPEG encoding of one image data is completed and encoded data is stored in the SDRAM 120, the encoded data stored in the SDRAM 120 is combined with one frame JPEG image by rearranging the encoded data using information stored in the SDRAM 120 in steps S103 and S104. The combined JPEG image is recorded in the memory card 114.

When the encoded data is rearranged and recorded in the memory card 114, the information stored in the SDRAM 120 is read and referred to, and a data combination is possible in units of MCU rows as illustrated in FIG. 8. That is, the initiation address of the MCU row in the uppermost part of tile 0 and the information on the bit amount of each MCU row after the encoding are read from the SDRAM 120, and how much of the MCU row in the uppermost part of tile 0 should be read from what part of the SDRAM 120 can be known.

Continuously, by reading the initiation address of the MCU row in the uppermost part of tile 1 and the information on the bit amount of each MCU after the encoding from the SDRAM 120, how much of the MCU row in the uppermost part of tile 1 should be read from what part of the SDRAM 120 can be known, so that the read MCU row may be connected to a back of the MCU row in the uppermost part of tile 0.

According to an embodiment of the present invention as described above, when the developing unit 110 generates image data including YCbCr information containing a luminance signal and a chromaticity signal and supplies the image data to the image compressor 112 without passing through the SDRAM 120, one image is divided into a plurality of tiles and the tiles are supplied to the image compressor 112 from the developing unit 110. The image compressor 112 performs a variable length encoding on the image data in units of tiles. In the variable length encoding, the initiation address information of each MCU row after the encoding, the bit length of each MCU row after the encoding, and the DC value of each of Y, Cb, and Cr are recorded in the SDRAM 120.

Figure 9:
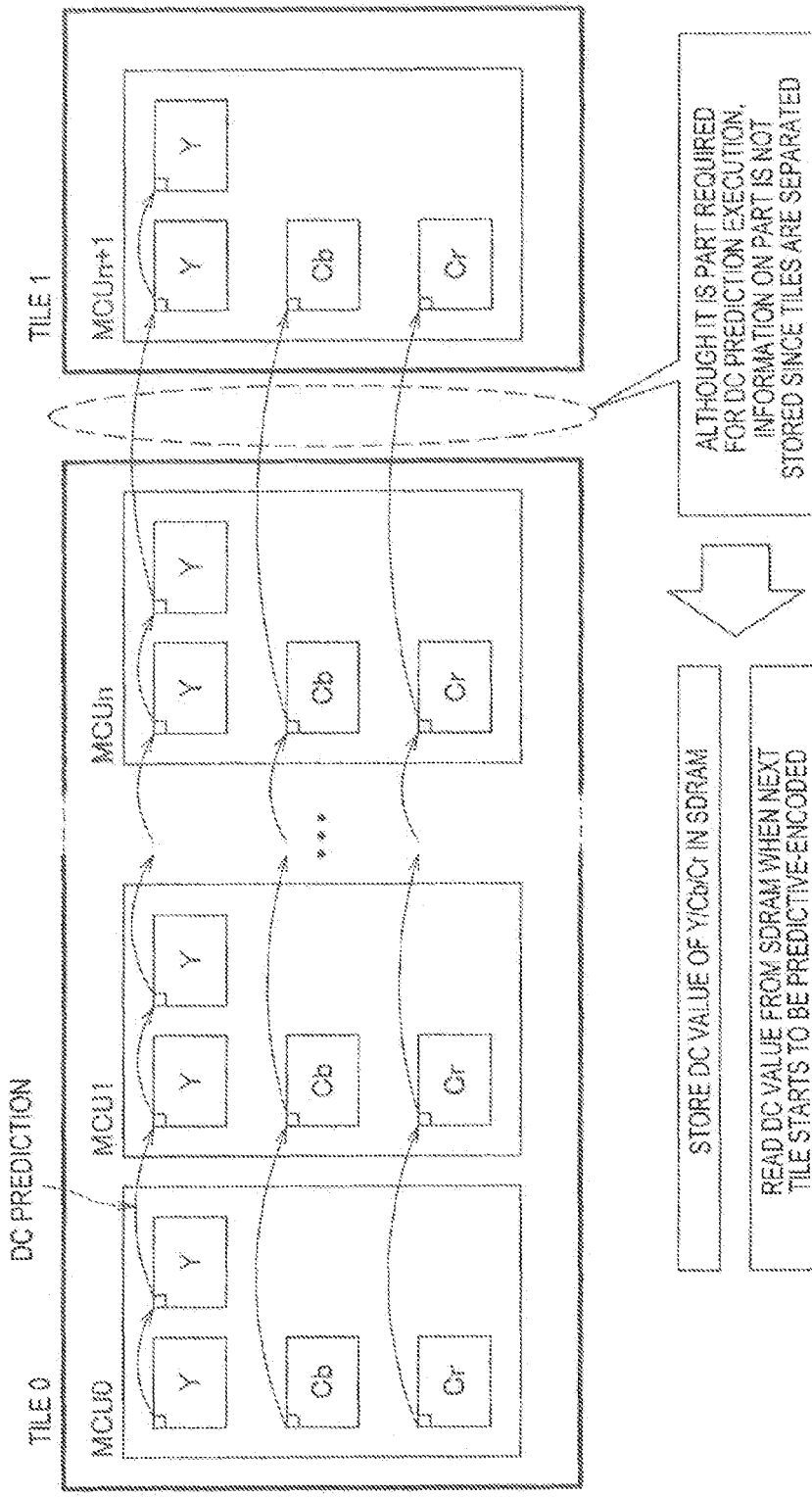
FIG. 9 illustrates a predictive encoding of a digital still camera according to an embodiment of the present invention.

FIG. 9 illustrates a predictive encoding in the digital still camera 100 according to an embodiment of the present invention. In the above manner, the initiation address information of each MCU row after the encoding, the bit length of each MCU row after the encoding, and the DC value of each of Y, Cb, and Cr are recorded in the SDRAM 120, and the predictive encoding using the DC value of each of Y, Cb, and Cr is possible in a boundary of tiles.

In the variable length encoding, as the initiation address information of each MCU row after the encoding, the bit length of each MCU row after the encoding, and the DC value of each of Y, Cb, and Cr are recorded in the SDRAM 120, one RST marker code has only to be located in a rightmost part of the MCU row, so that an encoding efficiency of the variable length encoding may be higher than that of the prior art. Further, since the RST marker code is not inserted into each tile, a width of each tile may be freely set, and thus various widths of the image may be applied.

Here, a processing required for generating the JPEG image by combining data variable length encoded in units of tiles will be described. The DMA I/F 137 for generating the JPEG image by combining the variable length encoded data is required to have the following functions.

(1) Byte Alignment

The MCU row within each tile is not byte-aligned. As described above, the DMA I/F 137 reads each MCU row and needs to combine the variable length encoded data by performing a bit shift.

(2) "00" Padding After "FF"

Figure 10:
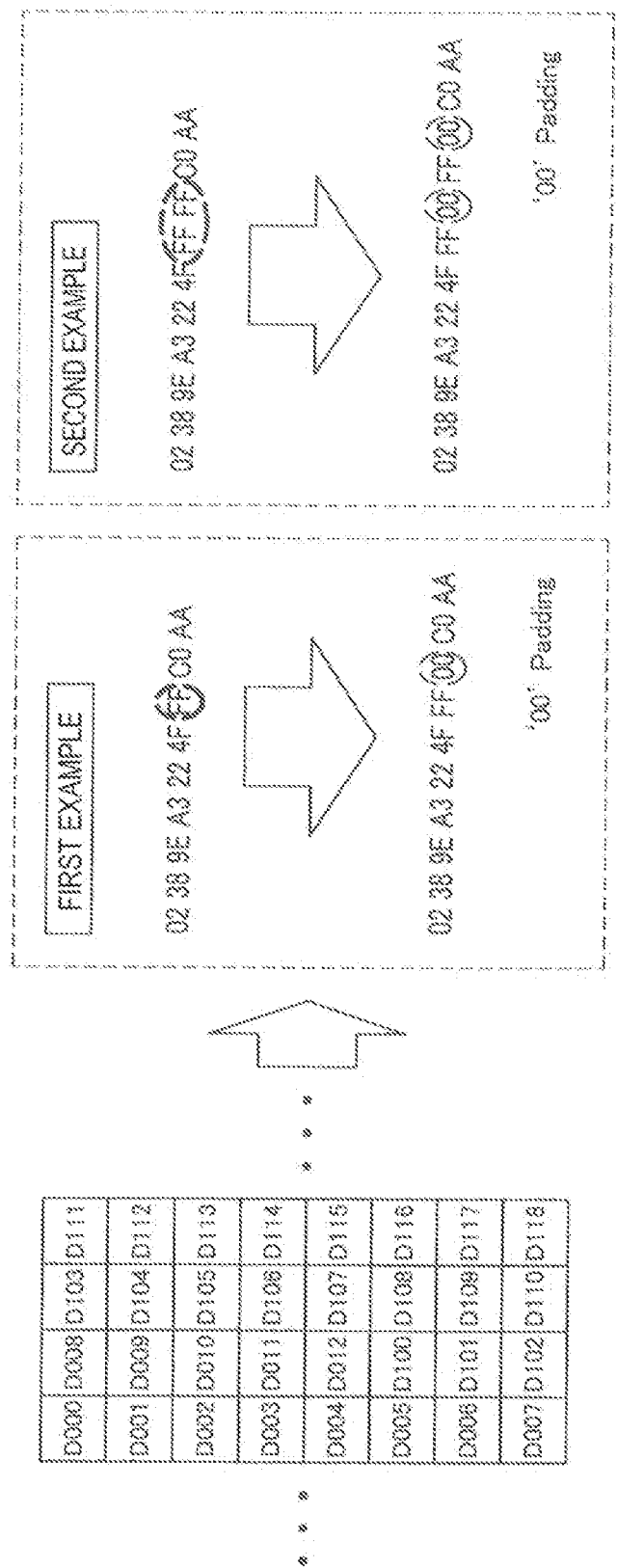
FIG. 10 illustrates an insertion of "00" bytes when the eighth number of "1" bits are consecutive in a byte boundary in a JPEG stream.

In a JPEG stream, when the eighth number of "1" bits are consecutive in the byte boundary, that is, when there is "FF" in hexadecimal number in a case where the JPEG stream is viewed with screens such as an editor and the like, next bytes should be "00". Accordingly, when the eighth number of "1" bits are consecutive in the byte boundary, it is required to add "00" bytes. However, the image compressor 112 for executing the JPEG encoding cannot know where the byte boundary is in the data which is being encoded, so that the DMA I/F 137 which is rearranging the data is required to perform the addition of "00" bytes. FIG. 10 illustrates an insertion of "00" bytes when the eighth number of "1" bits are consecutive in the byte boundary in the JPEG stream.

For this reason, the image compressor 112 searches for a part where the eighth number of "1" bits are consecutive in the byte boundary in the stream of the image which is encoded. When there is the part where the eighth number of "1" bits are consecutive, an address of the part is recorded in the SDRAM 120 as a file. Further, the DMA I/F 137 for recording the image after the JPEG encoding in the memory card 114 inserts "00" bytes to the corresponding part with reference to the address of the part where the eighth number of "1" bits are consecutive, written in the SDRAM 120 by the image compressor 112.

FIG. 10 shows two examples. In a first example, when there is "FF", that is, a part where the eighth number of "1" bits are consecutive in the byte boundary, "00" bytes are inserted after "FF". In a second example, when there is "FF", that is, a part where the sixteenth number of "1" bits are consecutive in the byte boundary, "00" bytes are inserted after each "FF".

In the stream of the image data which is being encoded, the image compressor 112 searches for the part where the eighth number of "1" bits are consecutive in the byte boundary and writes the part in the SDRAM 120, and the DMA I/F 137 inserts "00" bytes with reference to the information. Accordingly, in this case, an effect of reducing a time spent on combining the data by the DMA I/F 137 can be expected in comparison with the case where the DMA I/F 137 searches for the data.

(3) Addition of the RST Marker Code

Since the RST marker code is needed to be recorded in a byte boundary, the DMA I/F 137 for recording the image after the JPEG encoding in the memory card 114 inserts the RST marker code. An object of the present embodiment is to reduce the number of RST marker codes as much as possible when the encoding is performed by dividing one image into a plurality of tiles. Meanwhile, a rightmost edge part of each MCU line definitely needs the RST marker code.

Figure 11A:
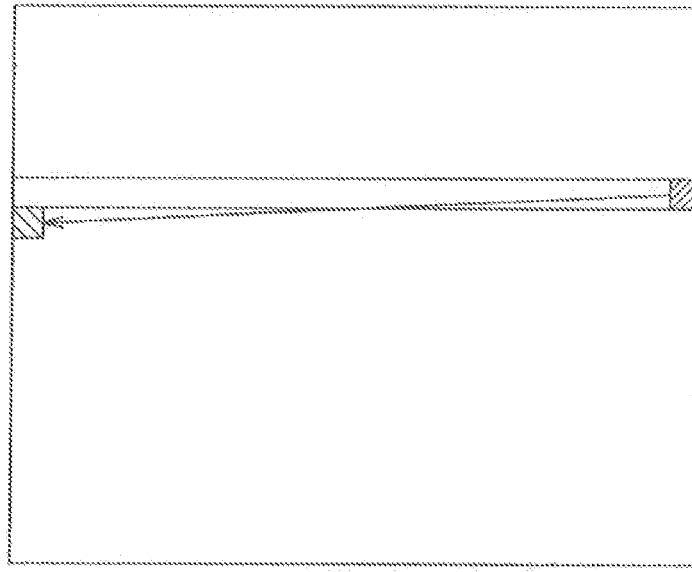
FIGS. 11A, 11B, and 12 illustrate a process of adding an RST marker code according to an embodiment of the present invention.
Figure 11B:
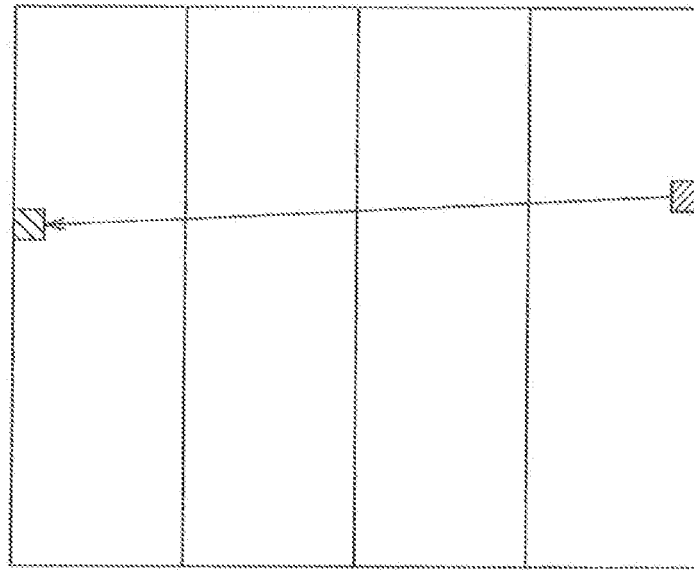

In the general JPEG encoding, the DC value of the MCU in the leftmost edge is predictive-encoded using information on the MCU in the rightmost edge of the upper MCU row. However, in the present embodiment, since a left edge tile is first encoded, the information on the MCU in the rightmost edge cannot be referred to. FIGS. 11A and 11B illustrate a state where information on the MCU in the rightmost edge cannot be referred to since a tile in the left edge is first encoded. Accordingly, in the present embodiment, the digital still camera 100 horizontally adds the RST marker codes one by one.

Figure 12:
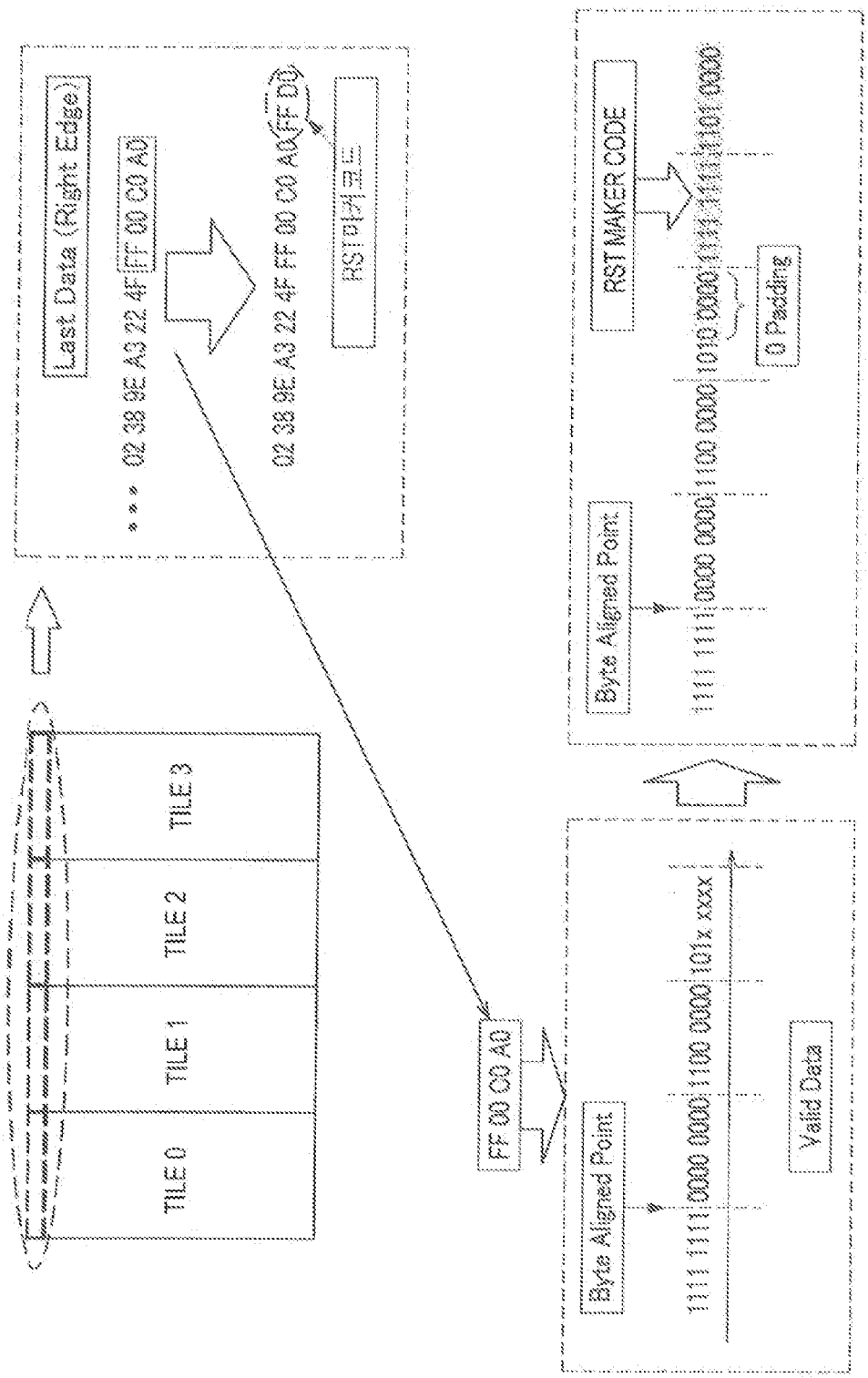

FIG. 12 illustrates an insertion of the RST marker code before the MCU in a left edge of a left edge tile when data is combined by the DMA I/F 137 of the digital still camera 100 according to an embodiment of the present invention. When the data is combined by the DMA I/F 137, it is possible to generate data suitable for a standard of the JPEG by inserting the RST marker code before the MCU in the left edge of the left edge tile.

In an example illustrated in FIG. 12, data in a right edge part of tile 3 is extracted. In the case illustrated in FIG. 12, the RST marker code must be added after data in a right edge of tile 3 in an uppermost part. Further, in the example of FIG. 12, when the data in the rightmost edge of tile 3 in the uppermost part lacks five bits in the byte boundary as valid data, the five bits are filled with "0" and then the RST marker is added when the data is combined by the DMA I/F 137. Accordingly, the digital still camera 100 according to the present embodiment can generate data suitable for the standard of the JPEG.

As described above, in the digital still camera 100 according to an embodiment of the present invention, when the developing unit 110 generates the image data including YCbCr information containing the luminance signal and the chromaticity signal and supplies the image data to the image compressor 112 without passing through the SDRAM 120, one image is divided into a plurality of blocks and then the blocks are supplied to the image compressor 112 from the developing unit 110. The image compressor 112 performs the variable length encoding on the image data in units of tiles. In the variable length encoding, the initiation address information of each MCU row after the encoding, the bit length of each MCU row after the encoding, and the DC value of each of Y, Cb, and Cr are recorded in the SDRAM 120.

In the variable length encoding, as the initiation address information of each MCU row after the encoding, the bit length of each MCU row after the encoding, and the DC value of each of Y, Cb, and Cr are recorded in the SDRAM 120, one RST marker code has only to be located in a rightmost part of the MCU row, so that encoding efficiency of the variable length encoding may be higher than that of the prior art. Further, since the RST marker code is not inserted into each tile, a width of each tile may be freely set, and thus the present invention may be applied to any image having any width.

Further, when the digital still camera 100 makes one image file by performing the variable length encoding on the image data in units of tiles and combining the encoded data, the digital still camera 100 performs a bit-shift on the data and adds "00" padding and the RST marker code to make the data suitable for the standard of the JPEG. Accordingly, the digital still camera 100 according to an embodiment of the present invention is not required to temporarily store the image data including YCbCr information in the SDRAM 120, so that it is possible to reduce power consumption and a capacity of the SDRAM and to obtain an image file suitable for the standard of the JPEG.

According to the present invention, in processing an image, when a JPEG compression encoding is performed by dividing an image after image processing into a plurality of blocks without passing through an external memory, it is possible to simply perform the JPEG compression encoding and a combination of images after the compression without encoding efficiency deterioration or a limitation in an image size of the block.

While the embodiments of the present invention have been described in detail with reference to the accompanying drawings, the present invention is not limited thereto. It will be understood by those skilled in the art that various changes in form and details may be made therein without departing from the spirit and scope of the present invention as defined by the appended claims.

What is claimed is:

1. An imaging apparatus comprising:
   an image processor for generating image data from data generated by a light input into an imaging device;
   an encoder for encoding the image data to generate encoded image data; and
   a storage unit for storing the encoded image data,
   wherein the image processor horizontally divides the image data into a plurality of blocks and supplies the blocks to the encoder without passing through the storage unit, and when the image data is encoded in units of blocks, the encoder simultaneously stores an initiation address of a corresponding line to be encoded in a corresponding block and a data length after the corresponding line is encoded in the storage unit and stores information used for a predictive encoding in the storage unit in every corresponding line to be encoded in the corresponding block.

2. The imaging apparatus of claim 1, wherein the encoder reads the information used for the predictive encoding from the storage unit when a predictive encoding of a block adjacent to a block associated with the information is performed.

3. The imaging apparatus of claim 1, further comprising a combiner for combining the encoded image data encoded in the units of blocks by using the encoded image data stored in the storage unit, the initiation address, and the data length after the encoding.

4. The imaging apparatus of claim 1, wherein the encoder searches for a position of particular data in the encoded image data and stores information on the position in the storage unit.

5. The imaging apparatus of claim 1, wherein the information used for the predictive encoding corresponds to a Direct Current (DC) value of each of Y, Cb, and Cr of a Minimum Coded Unit (MCU) in a rightmost part of the corresponding line.

6. The imaging apparatus of claim 1, wherein, when n number of "1" bits are consecutive in a byte boundary of the encoded image data, "00" bytes are inserted after the n number of "1" bits.

7. The imaging apparatus of claim 1, wherein a Restart (RST) marker code is inserted into a rightmost edge of the corresponding line.

8. An image processing method by an imaging apparatus, comprising:
generating image data from data generated by a light input into an imaging device;
horizontally dividing the image data into a plurality of blocks;
encoding the image data in units of blocks to generate encoded image data; and
when the image data is encoded in the units of blocks, simultaneously storing an initiation address of a corresponding line to be encoded in a corresponding block and a data length after the corresponding line is encoded in a storage unit and storing information used for a predictive encoding in the storage unit in every line to be encoded in the corresponding block.

9. The image processing method of claim 8, wherein the information used for the predictive encoding is read from the storage unit when the predictive encoding of a block adjacent to a block associated with the information is performed.

10. The image processing method of claim 8, further comprising combining the encoded image data encoded in the units of blocks by using the encoded image data stored in the storage unit, the initiation address, and the data length after the encoding.

11. The image processing method of claim 8, wherein a position of particular data in the encoded image data is searched for, and information on the position is stored in the storage unit.

12. The image processing method of claim 8, wherein the information used for the predictive encoding corresponds to a DC value of each of Y, Cb, and Cr of an MCU in a rightmost side of the corresponding line.

13. The image processing method of claim 8, wherein, when n number of "1" bits are consecutive in a byte boundary of the encoded image data, "00" bytes are inserted after the n number of the "1" bits.

14. The image processing method of claim 8, wherein an RST marker code is inserted into a rightmost edge of the corresponding line.

* * * * *